ism may be actuated, each independently of the other. My invention is here shown applied to the power-controlling means—commonly termed the accelerator—whereby more or less fuel is admitted to the place of consumption, and to the brake mechanism—the mode of organization being such that by means of the single device—here a pivoted foot pedal—the accelerator or the brake may be controlled, in such a way that the operation of the accelerator does not cause an operation of the brake, and the operation of the brake does not cause an operation of the accelerator. In the present specific embodiment of my invention, the pedal is pivoted upon a pivoted brake lever, and is connected by a link to the accelerator or power-controlling lever, which link passes through a transverse opening in said power-controlling lever and is shouldered beyond said opening. When said pedal is rocked or tilted on its pivot in one direction by the foot of the operator, the shoulder on the link engages the accelerator lever and moves the same to control the fuel supply to the carbureter. When retracted or moved in the other direction, said link slides freely through said lever opening without engaging said lever.

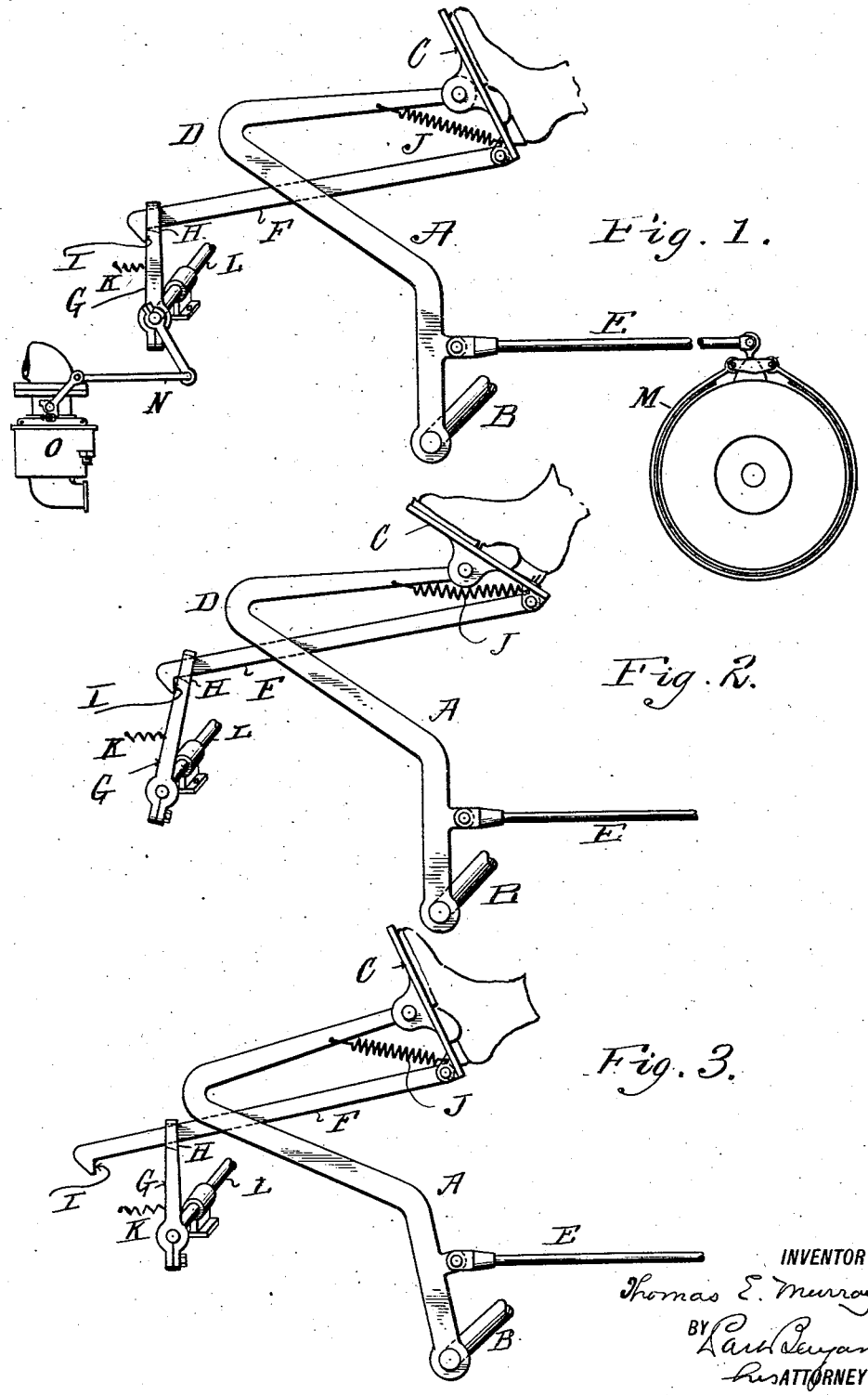

When the pedal is pushed by the foot of the operator to move the pivoted brake lever, said lever causes the application of the brake in the usual way; but this movement of the pedal is also in a direction to move the link freely through the accelerator lever opening, so that the operation of the brake cannot cause an operation of said accelerator lever.

In the accompanying drawings—

Figure 1 is an elevation of my controlling apparatus shown connected to the accelerator or fuel regulator and the brake of an automobile. Fig. 2 is a similar view, showing the position of the parts of the controlling apparatus when the pedal is operated to control the accelerator to increase the fuel flow. Fig. 3 is a similar view, showing the position of said parts when the pedal is operated to apply the brake.

Similar letters of reference indicate like parts.

In automobiles, as at present constructed, the accelerator and the emergency brake are commonly actuated by two separate devices, either of which may be operated by the foot of the driver at will. It has been found that under conditions requiring quick action, the driver may, through confusion, press his foot upon the wrong device; or, in other words, may operate the accelerator when the conditions require instant application of the brake, or operate the brake when the conditions require instant application of the accelerator—in either event with possibly disastrous consequences.

The problem which I have solved is to provide a single pedal, or like means, actuated by the driver's foot, whereby he can control either the accelerator or the emergency brake, so constructed that the operation of the accelerator only does not cause an operation of the brake, and the operation of the brake cannot cause an operation of the accelerator. I thus do away with the usual two separate devices, now operated by two separate pedals, and accomplish both purposes by a single pedal.

A is a lever, supported, on a pivot shaft B on the carriage. Said lever may pass through the floor in front of the driver in order to bring the pedal C in proper position to be operated by his foot—the lever being bent, as shown at D, or otherwise formed to adapt it to the placing described. To the lever A is connected the rod E which is to be connected to the usual emergency brake, shown at M. The pedal C on its under side is pivoted to the upper end of the lever A, and to said pedal is pivoted a link F. G is the accelerator lever, pivoted or supported on the usual rock shaft L which through the linkage N regulates the fuel supply to the carbureter O. In said lever is a transverse opening H, through which passes the link F, on the end of which, beyond said opening, is a hook or shoulder I.

When the driver tilts the pedal by raising his heel and pushing his toes downwardly, the shoulder I engages lever G and moves said lever to the position shown in Fig. 2, thus rocking its supporting shaft L to allow more fuel to pass to the carbureter, and thus accelerating the speed of the carriage. When the driver releases this pressure, the retracting spring J connected to pedal C and to brake lever A brings the pedal back to the position of Fig. 1, the link F then sliding freely through the opening H in lever G without operating said lever. So long as it is not desired to apply the brake, the accelerator may thus be controlled—that is, simply by tilting the pedal C on its pivot—and obviously the brake will not be affected.

When it is desired to apply the brake, the driver pushes his foot forward, thus swinging the brake lever A into the position shown in Fig. 3, and causing said lever to operate the brake through the rod E. But this bodily movement of the foot pedal also causes the link F to slide through the opening H in lever G in the manner already described. Hence the movement of the brake lever is not transmitted to the lever G, and the accelerator or power-controlling device is not operated. It will be apparent that the brake can be applied without any regard to the position of the accelerator lever, since said lever may be automatically retracted by a spring, as K, which comes into operation coincidently with the travel of the link through the lever opening to disengage its shoulder I from said lever.

The term "motor carriages" in the claims is to be construed as generic and inclusive of air or water carriages or traveling motor vessels of any kind, and is, therefore, not limited to land vehicles.

I claim:

1. A controlling apparatus for motor carriages, comprising a brake, a fuel supply regulator, a single operating member, and means connected to said operating member and to said fuel supply regulator and said brake for actuating said regulator and said brake each independently of the other.

2. A controlling apparatus for motor carriages, comprising a brake, a fuel supply regulator, a single operating member, means connected to said operating member and to said fuel supply regulator and said brake for actuating said regulator and said brake each independently of the other, and means for disconnecting said operating member from said regulator actuated by the movement of said member to apply said brake.

3. A controlling apparatus for motor carriages, comprising a brake, a pivoted lever for actuating said brake, a fuel regulator, a pivoted lever for actuating said regulator, a pedal pivoted on said brake lever, and a link interposed between said pedal lever and said regulator lever.

4. A power and brake-controlling apparatus for motor carriages, comprising a pivoted brake-controlling lever, a pivoted power-controlling lever having a transverse opening, a pedal pivoted on said brake-controlling lever, and a link pivoted to said pedal and extending through said opening and having a shoulder engaging with said power-controlling lever; whereby said pedal may be tilted on its pivot to cause said shoulder to engage with said power-controlling lever to operate the same, and whereby when said pedal is moved to actuate said brake-controlling lever, said link is caused to slide freely through said opening in said power-controlling lever without operating said power-controlling lever.

5. A power-controlling apparatus for motor vehicles, comprising a support, a pedal pivoted thereon, a pivoted power-controlling lever having a transverse opening, a link connected to said pedal and extending through said opening and having a shoulder engaging with said power-controlling lever, a retracting spring connected to said pedal and said support, and a retracting spring for said power-controlling lever; whereby when said pedal is tilted in one direction, said link engages with said power-controlling lever to operate the same, and when said pedal is retracted by its spring in the opposite direction, said link is caused to slide freely through said opening in said power-controlling lever without operating the same.

In testimony whereof I have affixed my signature in presence of two witnesses.

THOMAS E. MURRAY, Jr.

Witnesses:
GERTRUDE T. PORTER,
MAY T. McGARRY.